C. H. J. DILG.
WASHING MACHINE.
APPLICATION FILED DEC. 12, 1918.
1,346,595.
Patented July 13, 1920.
2 SHEETS—SHEET 1.
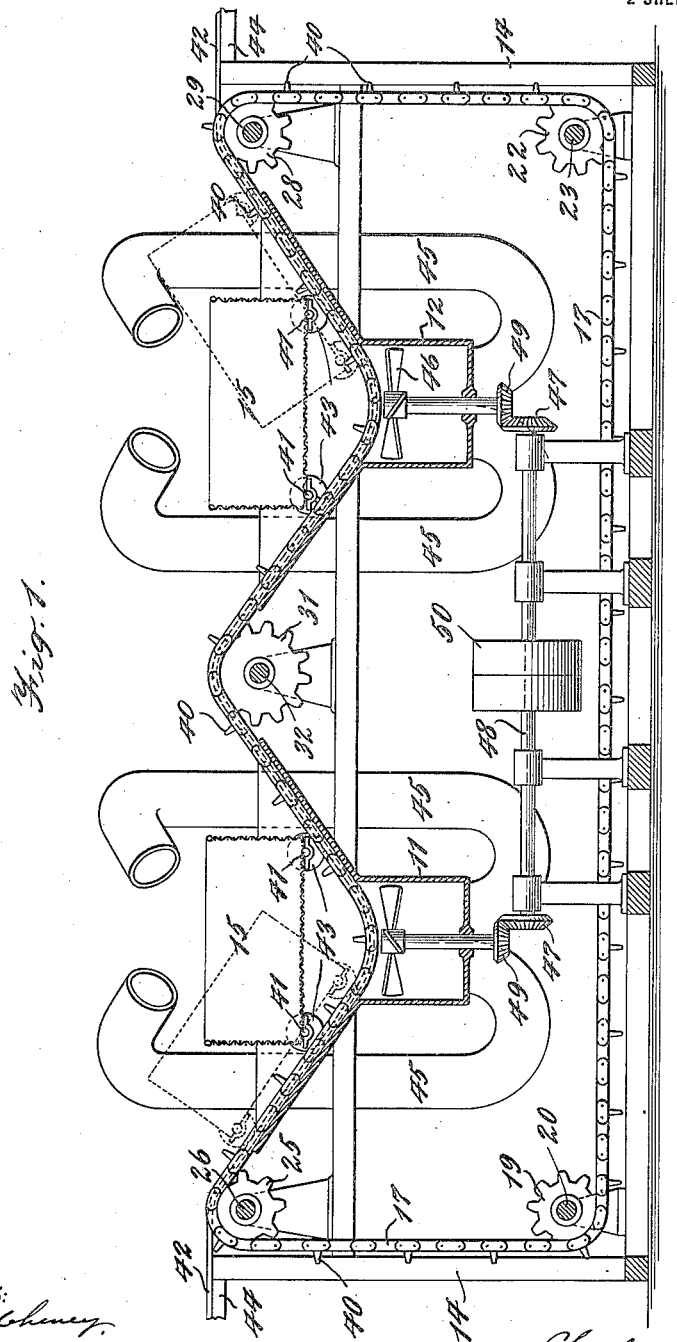
WITNESS:
INVENTOR.
Charles H. J. Dilg
BY
Rosenbaum, Stockbridge & Borst
ATTORNEYS

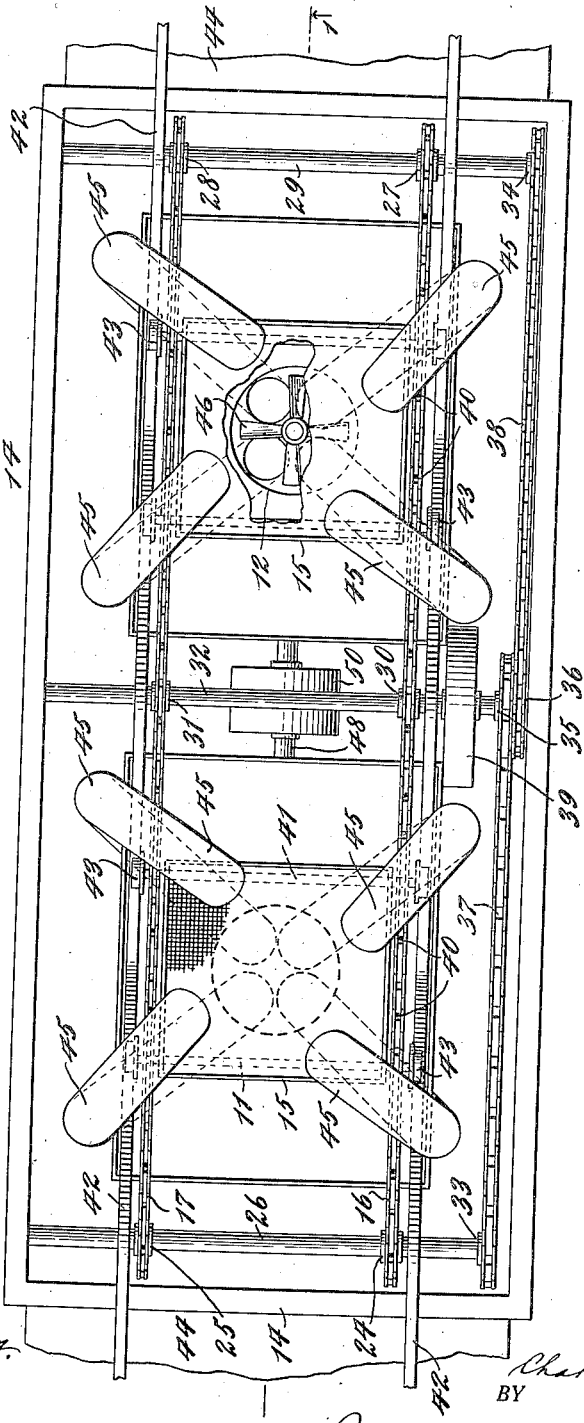

UNITED STATES PATENT OFFICE.

CHARLES H. J. DILG, OF NEW YORK, N. Y.

WASHING-MACHINE.

1,346,595.  Specification of Letters Patent.  Patented July 13, 1920.

Original application filed March 26, 1913, Serial No. 757,043. Divided and this application filed December 12, 1918. Serial No. 266,404.

*To all whom it may concern:*

Be it known that I, CHARLES H. J. DILG, a citizen of the United States, residing at the city of New York, in the borough of Manhattan and State of New York, have invented certain new and useful Improvements in Washing-Machines, of which the following is a full, clear, and exact description.

My invention relates to washing and rinsing machines, and embodiments of my invention are particularly adapted for washing and rinsing dishes and other similar articles, this application being a division of Patent No. 1,207,720, dated December 12, 1916.

An object of my invention is to provide a machine which will be simple, reliable and effective in its operation, and which will be durable, and will be inexpensive to manufacture and to maintain.

Another object is to provide a construction in which the dishes to be cleansed will be presented at different times during their cleansing operation at different angles to streams of cleansing fluid directed upon them.

Other objects and advantages of my invention will appear from the following description.

To these ends my invention comprehends various advantageous features of construction, and arrangements and combinations of parts, as will hereinafter more fully appear.

I shall now describe the embodiments of my invention illustrated in the accompanying drawings and shall thereafter point out my invention in claims.

Figure 1 is a central longitudinal sectional elevation of a machine embodying my invention, taken on line 1—1 of Fig. 2, looking up; and Fig. 2 is a plan of the same.

In the illustrated embodiment of my invention, two tanks 11 and 12 are employed, the former containing the washing or cleansing water and the latter the rinsing water. These tanks are suitably supported on the frame 14 of the machine. The tops of the tanks flare outwardly longitudinally of the machine, as shown, thereby providing inclined ways down which the baskets or carriers 15 for the dishes ride through the tanks. These baskets or carriers are preferably foraminous, as shown in Fig. 1, although, for the sake of clearness, they appear as solid in Fig. 2, the parts underneath being shown in dotted lines, except where one of the carriers is partly broken away in this figure. To thus convey the carriers through the tanks, two endless carrier sprocket chains 16 and 17 are provided on opposite sides of the machine. To propel these sprocket chains, five pairs of sprocket wheels are provided, two sprocket wheels on the transverse shaft 20 (one of which, marked 19, is shown), and two sprocket wheels on the transverse shafts 23 (one of which, marked 22, is shown), guide the respective sprocket chains at the two lower corners of the machine; the sprocket wheels 24 and 25 on the transverse shaft 26 and the sprocket wheels 27 and 28 on the transverse shaft 29 guide them at the two upper corners of the machine; while two sprocket wheels 30 and 31 on the transverse shaft 32 at the top of the machine between the two tanks serve as a middle guide. The sprocket chains are of such length that they sag or are depressed at the top and follow the outline of the inclined ways, as shown, thereby running through the tanks.

To impart motion to the carrier sprocket chains 16 and 17, the two upper corner shafts 26 and 29 are provided on one end with sprocket wheels 33 and 34, respectively, while the middle shaft 32 is provided on its corresponding end with two sprocket wheels 35 and 36, the former being connected to the sprocket wheel 33 by an endless driving sprocket chain 37, and the latter being connected to the sprocket wheel 34 by an endless driving sprocket chain 38. The shaft 32 is driven in any suitable way, as by a belt connecting a pulley 39 on the shaft to any suitable source of power, and this shaft rotates the sprocket wheels 30 and 31, and, through the driving chains 37 and 38, rotates the shafts 26 and 29 and the sprocket wheels carried thereby, and the carrier chains 16 and 17 are thus driven. The sag or slack in the chains 16 and 17 is properly maintained by the sprocket wheels 33, 34, 35 and 36, and by the sprocket chains 37 and 38, which serve to maintain the sprocket wheels over which the chains 16 and 17 run on the shafts 26, 32 and 29, in the same rotative relation.

The carrier chains are provided at suitable intervals with lugs or prongs 40, which are arranged to engage the axles 41 of the carriers 15, and through this connection the carriers are moved along with the carrier chains. To support the carriers 15 and facilitate their movement, tracks or rails 42 are laid along, one outside of each sprocket chain and conforming thereto, thereby forming guide rails on which the wheels 43 of the carriers run as the carriers are moved along by the sprocket chains. These tracks 42 run out a suitable distance upon platforms 44 at the ends of the machine.

It is now apparent that as the carrier 15 is placed upon the platform 44 at the receiving end of the machine and moved over until caught by the carrier chains 16 and 17, it will be automatically carried over the inclined ways through the tanks 11 and 12 and deposited on the platform at the other end of the machine, by means of the apparatus above described.

While moving the dishes through the tanks, I also subject them to the action of streams of water so directed as to set up rotary currents. The bottom of each tank communicates with four tubes or conduits 45, which terminate in depending mouths or spouts overhanging the tank and directed eccentrically upon the tank and at an angle to the radial planes containing the respective objective points, as shown, so as to produce a rotary motion to the water and thus produce an excellent cleansing effect. The water in the tank is continuously pumped up through these tubes by a suitable pump, such as a screw 46, the two screws being driven by bevel gears 47 on the ends of a longitudinally extending driving shaft 48, which bevel gears mesh with the respective bevel gears 49 on the screw shafts. Motion is imparted to the driving shaft 48, as by a belt suitably driven and running over a drive pulley 50 on the drive shaft 48. At the same time that the dishes are passing through the tanks of water, therefore, they are being subjected to these streams of water so directed as to set up rotary currents, and by the time they have passed through both sets of streams they are thoroughly cleansed and rinsed.

It is manifest that as the dishes are carried first downwardly and then upwardly through the tanks, the streams of water strike first one edge and then the opposite edge of the dishes in an inclined position, as indicated in dotted lines in Fig. 1, and that the removal of the particles from the dishes is thereby greatly facilitated.

It is obvious that various modifications may be made in the constructions shown in the drawings and above particularly described within the principle and scope of my invention.

I claim:

1. A dish washing machine comprising a tank including inclined ways leading into and out of the tank, a carrier for the dishes, means for conveying the carrier into and out of the tank along the inclined ways, and spouts overhanging the tank and arranged to discharge water into the tank upon both of the inclined ways, whereby the dishes are presented at one angle to the stream of water as they are conveyed into the tank and at another angle as they are conveyed out of the tank.

2. A dish washing machine comprising a tank including inclined ways leading into and out of the tank, a carrier for the dishes, means for conveying the carrier into and out of the tank along the inclined ways, and a set of spouts overhanging the tank and arranged to direct a stream of water eccentrically into the tank upon each of the inclined ways, whereby a rotary motion is imparted to the water in the tank and the dishes are presented at one angle to the stream discharged upon them as they are conveyed into the tank and at another angle to the stream discharged upon them as they are conveyed out of the tank.

3. A dish washing machine comprising a carrier for the dishes, a plurality of tanks having inclined ways leading into and out of the tanks, a set of spouts for each tank arranged to direct streams of water eccentrically into the tank so as to produce a rotary motion therein, means for supplying water to each set of spouts, and means for conveying the carrier along the inclined ways and through the tanks in the range of the successive sets of spouts whereby it is subjected successively to the combined action of the streams from each set of spouts.

In witness whereof I subscribe my signature.

CHAS. H. J. DILG.